United States Patent
Martin et al.

(10) Patent No.: US 10,670,733 B2
(45) Date of Patent: Jun. 2, 2020

(54) SATELLITE GEOPOSITIONING METHOD AND ASSOCIATED TERMINAL

(71) Applicant: Thales, Courbevoie (FR)

(72) Inventors: Nicolas Martin, Bourg les Valence (FR); Denis Bouvet, Valence (FR); Hervé Guichon, Guilherand-Granges (FR)

(73) Assignee: Thales, Courbevoie (FR)

( * ) Notice: Subject to any disclaimer, the term of this patent is extended or adjusted under 35 U.S.C. 154(b) by 486 days.

(21) Appl. No.: 15/465,151

(22) Filed: Mar. 21, 2017

(65) Prior Publication Data
US 2017/0276799 A1   Sep. 28, 2017

(30) Foreign Application Priority Data
Mar. 25, 2016   (FR) ..................... 16 00503

(51) Int. Cl.
*G01S 19/41* (2010.01)
*G01S 19/40* (2010.01)
*G01S 19/32* (2010.01)

(52) U.S. Cl.
CPC .............. *G01S 19/41* (2013.01); *G01S 19/32* (2013.01); *G01S 19/40* (2013.01)

(58) Field of Classification Search
CPC .......... G01S 19/41; G01S 19/32; G01S 19/33; G01S 19/40
See application file for complete search history.

(56) References Cited

U.S. PATENT DOCUMENTS

| | | | |
|---|---|---|---|
| 6,516,021 B1 * | 2/2003 | Abbott | G01S 19/26 342/108 |
| 7,439,908 B1 * | 10/2008 | Zhodzishsky | G01S 19/43 342/357.24 |
| 2008/0129586 A1 * | 6/2008 | Martin | G01S 19/47 342/357.25 |
| 2011/0205116 A1 | 8/2011 | Fujisawa | |
| 2012/0286991 A1 * | 11/2012 | Chen | G01S 19/04 342/357.23 |

(Continued)

OTHER PUBLICATIONS

French Search Report and Written Opinion dated Dec. 6, 2016, in French Patent Application No. 1600503, filed Mar. 25, 2016, 9 pages.

(Continued)

*Primary Examiner* — Marc Anthony Armand
(74) *Attorney, Agent, or Firm* — Davis Wright Tremaine LLP; Michael J. Donohue

(57) ABSTRACT

The invention concerns a satellite geopositioning method on the basis of satellites each transmitting dual-frequency signals. The method comprises, for each satellite,
a step of computation of four pseudo-distances on the basis of the two codes and the two carriers of the received dual-frequency geopositioning signals,
a step of correction of the ionospheric delays over each computed pseudo-distance by applying an ionospheric error propagation model,
a step of carrier code smoothing using a Kalman filter in order to provide a pseudo-distance measurement without measurement noise and to correct the residual ionospheric error.
The position is estimated by using the corrected pseudo-distances computed for each satellite.

20 Claims, 2 Drawing Sheets

(56) References Cited

U.S. PATENT DOCUMENTS

2017/0045624 A1* 2/2017 Drescher ................. G01S 19/07
2017/0276800 A1* 9/2017 Wada ...................... G01S 19/44

OTHER PUBLICATIONS

Martin, Nicolas, et al., "RAIM with Kalman Code Carrier Smoothing," GNSS 2012 Proceedings of the 25th International Technical Meeting of the Satellite Division of the Institute of Navigation (ION GNSS 2012), Sep. 21, 2012, pp. 2259-2274, XP056008523, p. 2265, section "Smoothing with 2 state Kalman filter," p. 2269, section Independent code carrier smoothing.

Hwang, Patrick Y., et al., "Enhanced Differential GPS Carrier-Smoothed Code Processing Using Dual-Frequency Measurements," Navigation, Institute of Navigation, vol. 46, No. 2, Sep. 1, 1999, pp. 127-138, EP056013314, ISSN: 0025-1522.

* cited by examiner

SATELLITE GEOPOSITIONING METHOD AND ASSOCIATED TERMINAL

The present invention concerns the field of satellite positioning. The invention more particularly concerns a satellite geopositioning method and an associated terminal.

A satellite positioning system (or GNSS for "Global Navigation Satellite System") uses a constellation of satellites that revolve about the earth on very precisely determined orbits, that is to say whose position at any instant can be known. The orbits of the satellites are chosen so that at any time, six to twelve satellites are visible at any point on the earth. Each satellite, known as a dual-frequency satellite, transmits electromagnetic geopositioning signals at two different frequencies (for example $L_1=1\ 575.42$ MHz and $L_2=1\ 227.6$ MHz for the GPS system and $L_1=1\ 575.42$ MHz and $E_5=1\ 227.6$ MHz for the GALILEO system).

A GNSS receiver receives the signals transmitted by visible satellites and measures the propagation time required in order for a time mark transmitted by a satellite to reach it. The time marks are coded on carrier waves by the phase modulation technique. Each satellite thus transmits its own pseudo-random code. A replica of the sequence of the code is generated by the receiver and the shift that the replica must undergo so as to coincide with the code received corresponds to the propagation time of the signal in order to travel the satellite-receiver distance. This time multiplied by the speed of light in the medium traversed gives a distance measurement called a pseudo-distance. On the basis of the measurements of the pseudo-distances separating it from each visible satellite, and of the knowledge of the position of the satellites, the receiver deduces its precise position in latitude, longitude, and in altitude in a terrestrial reference frame by a numerical solution procedure akin to triangulation. It can also deduce therefrom the date and the precise time in the temporal reference frame of the GNSS system.

The time reference of the receiver, provided by its clock, does not coincide perfectly with the time reference of the satellites of the constellation; this induces a bias in the measurements of propagation time, therefore of distance, that is equal to the delay of the time reference of the receiver with respect to the time reference of the satellites. The term "pseudo-distance" is employed for this purpose. The time bias, common to all the measurements, constitutes a fourth unknown, in addition to the three position unknowns, and this makes it necessary to have at least four measurements to compute the position.

Furthermore, the position of the reception terminal is estimated by making a certain number of approximations. The measurement of the pseudo-distance cannot, for example, circumvent the system-related errors such as the lack of precision of the ephemerides or clocks onboard the satellites. The measurement of the pseudo-distance is also marked by errors relating to the interactions between the signals and the atmospheric layers (troposphere and ionosphere) that they pass through. The signal propagation delay in the troposphere and the ionosphere is dependent on the inclination of the path and the time at which said path occurs. Typically, GNSS positioning errors related to the atmosphere are more marked by day than at night and more sensitive when a satellite is closer to the horizon than to the zenith. In some applications, such as the precision approach in aeronautics, the positioning precision obtained by a direct or absolute measurement of the pseudo-distance is not sufficient.

The use of a differential measurement makes it possible to substantially improve the precision of the positioning. It consists in transmitting, via a dedicated channel (VHF, UHF or cellular telephony), corrections of the pseudo-distance measurements formulated on the basis of pseudo-distance measurements originating from receivers disposed in ground stations and whose positions are very precisely known and close to the onboard receiver. The measurement of the pseudo-distance separating a ground receiver and a satellite is compared with the theoretical distance separating these two devices. The theoretical distance is computed on the basis of the respective spatial coordinates of the ground receiver and of the satellite, which are known at any instant. The difference between the distance measurement and the theoretical distance represents the measurement error, it is computed for each satellite at each observation epoch. These distance differences constitute corrective terms (also called differential corrections) that are decided from the pseudo-distance measurements carried out by the mobile receiver. These corrections have the effect of almost totally removing the errors that exhibit a significant spatial correlation whatever their origin, system or atmospheric. The corrections are all the more effective the closer the two receivers. However, the differential measurement does not eliminate the errors related to the reflections of the signal on objects that are close to the antenna of the receiver, nor the errors specific to the receiver (thermal noise). These errors are present in the reference receiver as well in the onboard receiver, they degrade the positioning measurement during differential correction; the precision obtained is of the order of a few metres.

To improve the positioning precision, the ground receivers and carrier-borne mobile receivers can also exploit a second piece of information formulated by the receiver, which is the measurement of the phase of the carrier, for each satellite signal received. The measurement of the instantaneous phase of the carrier received actually makes it possible to compute a pseudo-distance, known as the carrier pseudo-distance, between the receiver and the satellite, in the same way as the measurement of the instantaneous phase of the pseudo-random code. This carrier pseudo-distance undergoes the same variations as the code pseudo-distance, when the distance between the receiver and the satellite or the time bias due to the clock of the receiver varies. This pseudo-distance measured by the phase is a priori ambiguous since the phase is known modulo $2\pi$ but it is much less noisy than the code pseudo-distance measurements.

A known solution for improving pseudo-distance measurements consists in smoothing the noisy pseudo-distance measurement carried out on the code using the not very noisy phase measurements. For this purpose, the receiver applies a low-pass filter, generally of first order, to the difference between the code pseudo-distance and carrier pseudo-distance measurements, then adds this filtered difference to the carrier pseudo-distance measurement so as to reconstitute the code phase measurement. This processing is carried out satellite axis by satellite axis. If the measurement is differential, an identical smoothing is applied to the receivers of the ground station so that the tracking error of the low pass filter, due to the divergence between the code and the carrier related to the fluctuations in the ionospheric delay, is identical on the ground and in the mobile receiver, and does not disturb the positioning measurement after application of the correction.

The main advantage of the axis-by-axis smoothing method is its simplicity and the absence of any effect of coupling between the measurements of the pseudo-distances of the various satellites or channels, nevertheless it is still not completely satisfactory. The reason is that the gain in precision of the measurement is significant only when smoothing is performed with a long time constant; and in this case, the reset time for recovering the precision after a sudden change to all of the available measurements is also long, for example when a satellite disappears as a result of masking, a fault in a satellite or even a fault in a ground receiver in the case of the differential GNSS.

In the presence of ionospheric scintillation, in particular close to the equator, carrier phase measurements on the signals transmitted by the satellites exhibit discontinuities. The reason is that, in the ionosphere, solar radiation causes partial ionization of gas atoms and molecules. Charged particles (ions and free electrons) are therefore encountered that are able to interact with an incident electromagnetic wave and to influence the propagation thereof. Ionospheric scintillation manifests itself in the form of more or less localized events, typically lasting a few hours and affecting Earth/satellite links. During a scintillation event, owing to the presence of ionized particles in the ionosphere, the signal received on Earth has amplitude and phase fluctuations that are liable to greatly disturb the link and compromise operation thereof. Owing to the fluctuations in the amplitude of the signals received by the geopositioning terminal, the tracking loops that ensure demodulation of the signal disengage when the amplitude is too small. Thus, the terminal can no longer depend on the continuity of the phase to perform carrier code smoothing. Each time the loop disengages, the carrier code smoothing filter needs to be reset and is necessary to wait for this filter to reconverge. By way of example, it is necessary to wait for at least one second to reengage the signal and regain a valid pseudo-distance measurement. These ionospheric scintillations therefore bring about regular degradation of precision.

In the case of a standard receiver, this phenomenon may not be troublesome because the geopositioning satellites do not all disengage at the same time, and if disengagement times are short, then the receiver still has at least four measurements available.

In the case of an aeronautical receiver, every disengagement is a problem because it is necessary to reset the carrier code smoothing filter and to wait for the filter to reconverge. During this convergence time, which is typically around one hundred seconds, the satellite measurement is not available to compute the point, or has a high level of deterioration. In light of the fact that the average time between two disengagements is ten seconds, the satellite measurements are still found to be unavailable. With current aeronautical receivers, positioning becomes unavailable in the presence of strong ionospheric scintillations.

The prior art discloses receivers designed to resist ionospheric scintillation by virtue of narrow tracking loop bands. This works for fixed receivers, with stable clocks, but not for aeronautical receivers.

An aim of the invention is particularly to correct all or some of the disadvantages of the prior art by proposing a solution allowing a geopositioning receiver to ensure the continuity of its positioning even in the presence of ionospheric scintillation.

To this end, the subject of the invention is a satellite geopositioning method implemented by a geopositioning terminal on the basis of at least four satellites each transmitting electromagnetic geopositioning signals, known as dual-frequency signals, at two different frequencies, each of said signals being formed by a carrier frequency modulated by a spreading code, said terminal comprising at least one reception module configured to receive the electromagnetic signals originating from each satellite at two different frequencies and at least one computation module configured to process said signals, said method comprising, for each geopositioning satellite, a step of computation, in a rated regime, of four pseudo-distances on the basis of the two codes and the two carriers of the received dual-frequency geopositioning signals, a step of correction of the ionospheric delays over each computed pseudo-distance by applying an ionospheric error propagation model, a step of carrier code smoothing using a Kalman filter in order to provide a pseudo-distance measurement without measurement noise and to correct the residual ionospheric error, the position of the geopositioning terminal being estimated by using the corrected pseudo-distances computed for each satellite.

According to one implementation, the method comprises a step of correction of tropospheric delays.

According to one implementation, the method comprises a step of correction of system errors.

According to one implementation, the method comprises a step of compensation for an interfrequency bias between the dual-frequency signals.

According to one implementation, the Kalman filter is configured to propagate a state vector comprising the value of the pseudo-distance without measurement noise, the value of the ionospheric error at a frequency after correction by the ionospheric error propagation model and the values of the float ambiguities of the carrier phase measurements at each of the two frequencies.

According to one implementation, the Kalman filter is configured to propagate a state vector moreover comprising the value of the interfrequency bias between the dual-frequency signals.

According to one implementation, the ionospheric error propagation model is a Kobuchar model.

According to one implementation, the ionospheric error propagation model is a Nequick model.

According to one implementation, the method comprises a step of storage of the ionospheric error.

The subject of the invention is also a satellite geopositioning terminal comprising at least one reception module configured to receive electromagnetic geopositioning signals, known as dual-frequency signals, transmitted by at least four satellites at two different frequencies and at least one computation module configured to process said geopositioning signals and implement the geopositioning method described above.

Other distinctive features and advantages of the present invention will become more clearly apparent on reading the description below, which is provided by way of illustration and without implying limitation, and written with reference to the appended drawings, in which.

It will subsequently be assumed that each geopositioning satellite transmits electromagnetic geopositioning signals at two different frequencies. Reference will be made to dual-frequency signals, and these two frequencies will be denoted Fa and Fb.

It will also be assumed that there is never disengagement of the two carriers at the same time, (or during a very short period of time), and that the geopositioning terminal receives at least one of the two geopositioning signals.

Figure 1:
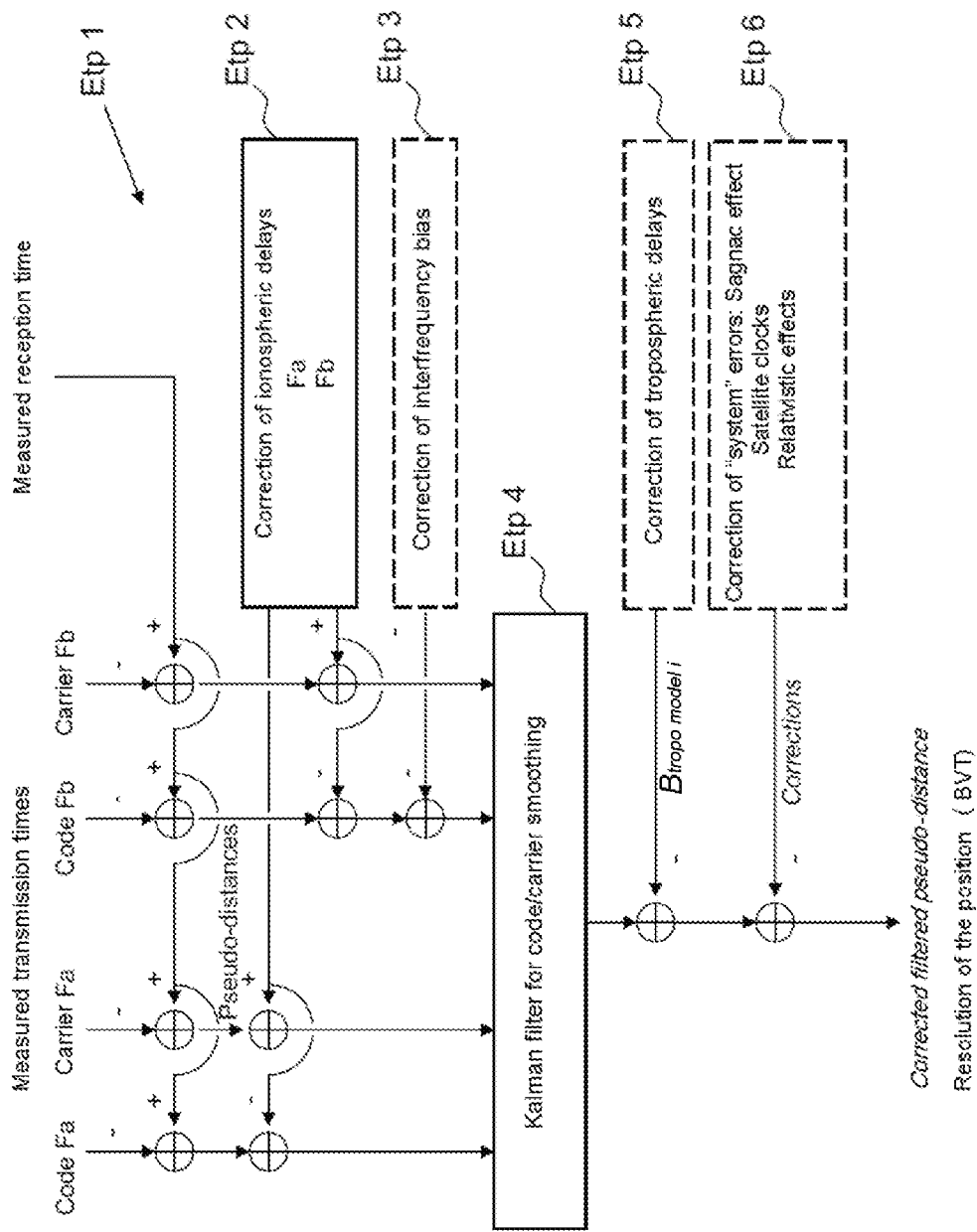
FIG. 1 shows an example of a block diagram of a satellite geopositioning method according to the invention.

FIG. 1 shows an example of a block diagram, for each satellite axis, of a satellite geopositioning method according to a preferred implementation of the invention.

This method is implemented by a geopositioning receiver or terminal on the basis of electromagnetic geopositioning signals transmitted by at least four geopositioning satellites. As set out above, each of these dual-frequency signals is formed by a carrier frequency modulated by a spreading code.

The method comprises, for each visible satellite, a first step Etp1 of measuring pseudo-distances. For this, the geopositioning terminal comprises at least one reception module configured to receive these electromagnetic signals originating from each satellite at two different frequencies.

In a known manner, this reception module can comprise at least one antenna, an analogue circuit performing amplifications and changes of frequency, an analogue-to-digital converter and at least N digital processing channels. Each channel being assigned to a satellite, the integer N will be chosen to be greater than the number of satellites from which it is desirable to receive geopositioning signals.

Each digital channel receives a digitized signal containing all of the satellite signals, which it subjects to a double control loop allowing firstly phase synchronization of a carrier generated locally using the carrier from the satellite under consideration and secondly synchronization of a pseudo-random code generated locally using an identical code that is present in the satellite signal and specific to this satellite.

The two control loops can each comprise two oscillators, the content of which represents, for the first oscillator, the instantaneous phase of the local pseudo-random code (aligned with the code that is present in the signal), which constitutes the measurement of the instantaneous phase of the received code, and, for the second oscillator, the instantaneous phase of the local carrier (aligned with the phase of the carrier that is present in the signal received from the satellite, except for the phase shift introduced by the circuits of the receiver), which constitutes the measurement of the instantaneous phase of the received carrier.

The measurement of the instantaneous phase of the code in each channel is used to compute a first digital datum called code pseudo-distance $PD_{code}$ representing a first measurement of the pseudo-distance between the receiver and the satellite under consideration. This measurement is unambiguous but fairly noisy.

The measurement of the instantaneous phase of the carrier in the channel under consideration is used to compute a second digital datum, called carrier pseudo-distance $PD_{carrier}$, representing a second measurement of the pseudo-distance between the receiver and the satellite under consideration. This measurement is less noisy but ambiguous.

As the signals are dual frequency, in a rated regime, two code pseudo-distances and two carrier pseudo-distances can be computed for each satellite visible to the receiver. There are therefore, in each digital channel, four independent measurements ($PD_{code\ a}$, $PD_{code\ b}$, $PD_{carrier\ a}$, $PD_{carrier\ b}$) of one and the same pseudo-distance separating the receiver from each satellite visible to the latter. For each satellite, the two types of pseudo-distance measurements ($PD_{code}$ and $PD_{carrier}$) are obtained in the form of signal propagation times between the satellite under consideration and the receiver along the axis (satellite axis) connecting the satellite under consideration and the receiver.

At the instant n, the pseudo-distances $PD_{code\ a}(n)$, $PD_{code\ b}(n)$ and $PD_{carrier\ a}(n)$, $PD_{carrier\ b}(n)$, respectively measured on the code and the carrier at the frequency Fa and the frequency Fb, are given by the formulae:

$$PD_{code\ a}(n)=(T_{reception}(n)-T_{sat\ a}(n))$$

$$PD_{code\ b}(n)=(T_{reception}(n)-T_{sat\ b}(n))$$

$$PD_{carrier\ a}(n)=(T_{reception}(n)-\varphi_{carrier\ a}(n)/Fa)$$

$$PD_{carrier\ b}(n)=(T_{reception}(n)-\varphi_{carrier\ b}(n)/Fb)$$

in which:
  $T_{reception}(n)$ represents the date, at the instant n at which the measurement is taken, provided by the clock of the receiver,
  $T_{sat\ a}(n)$ represents the date of transmission, by the satellite, of the signal received at the instant n by the receiver, provided by the local code phase,
  $\varphi_{carrier\ a}(n)$ represents the phase of the local carrier, returned as a carrier frequency (cycles).

For each satellite visible to the geopositioning receiver, the geopositioning method comprises a step Etp2 of correction of the ionospheric delays over each pseudo-distance computed by applying an ionospheric error propagation model. To this end, the terminal also comprises at least one computation module configured to process the received signals.

The ionospheric error propagation model may be a Kobuchar model, a Nequick model or any other equivalent model known to a person skilled in the art.

The ionospheric error propagation model provides an estimate of the ionospheric error in the measurement of code pseudo-distance for a frequency, for example the frequency Fa, on the basis of the position on Earth and the time of day. This ionoshperic error represents the group delay caused in the propagation of the signal when crossing the ionosphere. This delay is proportional to the total electronic content of the atmospheric column crossed by the signal and inversely proportional to the square of the carrier frequency. The delay is found in the code measurement. The effect on the carrier is a phase lead for the same absolute value.

If the ionospheric error at the frequency Fa is considered:
  in the carrier measurement Fa, then there is a phase lead of $-B_{iono}$,
  in the carrier measurement Fb, then there is a phase lead of $-\gamma \cdot B_{iono}$,
  in the code measurement Fa, then there is a delay of $B_{iono}=\alpha.\ CET/Fa^2$ and
  in the code measurement Fb, then there is a delay of $\gamma \cdot B_{iono}=\alpha.\ CET/Fb^2$
  where $\gamma=Fa^2/Fb^2$ Therefore, to correct the carrier code and phase measurements, the following corrections are applied:
  In $PD_{code\ a}$ (n): $-B_{iono\ model}$
  In $PD_{carrier\ a}$ (n): $+B_{iono\ model}$
  In $PD_{code\ b}$ (n): $-\gamma\ B_{iono\ model}$
  In $PD_{carrier\ b}$ (n): $+\gamma\ B_{iono\ model}$ Of course, similar reasoning can be applied by considering a model providing an estimate of the ionospheric error at the frequency Fb.

In order to process the signals transmitted by the geopositioning satellites at the two frequencies Fa and Fb, the reception module comprises two distinct analogue pathways. When this reception module receives two signals of different frequencies, the propagation times in each of the analogue pathways of a module may be different. This has the effect of introducing group delay differences between the two frequencies Fa and Fb, called RF biases.

When the measurements are homogenous, that is to say all single frequency at the same frequency or all dual frequency, the RF biases, which are common to all satellites, have no effect on the resolute position. By contrast, when mixing single frequency measurements at different frequencies or single-frequency and dual-frequency measurements, distortions are introduced between the satellite measurements, therefore an error in the resolute position. This scenario can arise, for example, when one of the two dual-frequency signals is not received by the geopositioning terminal, for example following ionospheric scintillation problems.

In order to avoid this, for each visible satellite, the method can comprise a step Etp3 of compensating for an interfrequency bias between the dual-frequency signals.

In the course of this step, the computation module identifies the RF bias gap between the two frequencies in the dual-frequency signal measurements and corrects this gap on all satellites by compensating for the gap between the two frequencies only in the code measurements and only at one of the two frequencies. Identification of the RF bias and correction thereof can be implemented by using the techniques known to a person skilled in the art, particularly the technique developed in the patent application FR 2 943 868. The RF bias gap can be estimated by averaging all dual-frequency-signal measurements available from the beginning (average over time and over the satellites) and by regarding the RF biases to be constant over time.

The dual-frequency code measurements of each satellite are then smoothed using the dual-frequency carrier measurements in the course of a step Etp4 of smoothing the compensated pseudo-distances using a Kalman filter. In the course of this step, the Kalman filter simultaneously performs carrier code smoothing and correction of the residual ionospheric error.

Figure 2:
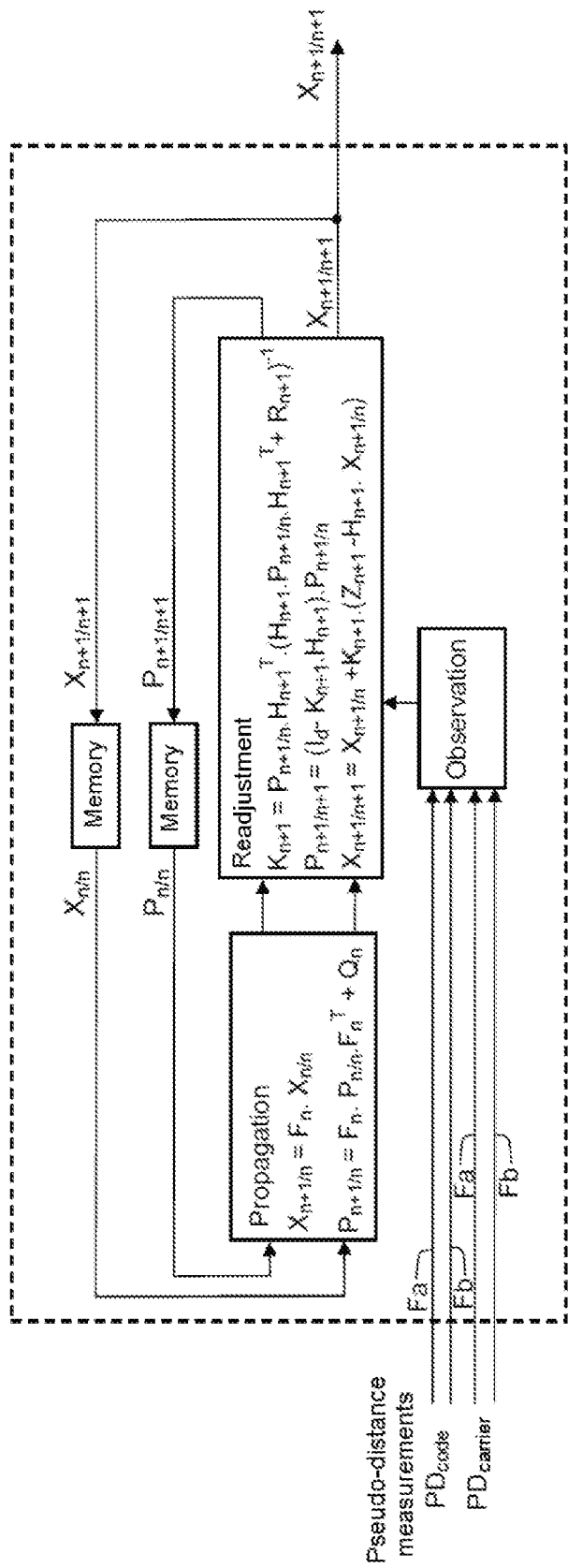
FIG. 2 shows an example of a flowchart for the operation of a receiver Kalman filter according to the invention.

With reference to FIG. 2, the operating principle of Kalman filtering is recalled.

Kalman filtering uses a state model, established on the basis of the knowledge (proven or assumed) of the behaviour of the unknown physical quantities to be determined and of the measurements available.

This state model consists of:
a state vector $X_n$ representing the physical quantities modelled at the instant $t_n$, having a number of components $N_{state}$.
a propagation model, in the form:

$$X_{n+1}=F_n \cdot X_n + V_n$$

in which:
$X_{n+1}$ is the state vector at the instant $t_{n+1}$, of
$F_n$ is the propagation matrix over the interval $[t_n, t_{n+1}]$, of dimension $N_{state} \times N_{state}$ (in which the operator "x" represents the multiplication sign).
$V_n$ is the white, Gaussian propagation noise vector over the interval $[t_n, t_{n+1}]$, of zero mean and covariance matrix $Q_n = E[V_n \cdot V_n^T]$ (where $V_n^T$ is the vector transpose of Vn) and of dimension $N_{state}$.
an observation model, in the form:

$$Z_n = H_n \cdot X_n W_n$$

in which:
$Z_{n+1}$ is the observation vector at the instant $t_n$, of dimension $N_{obs}$
$H_n$ is the observation matrix at the instant $t_n$, of dimension $N_{obs} \times N_{state}$;
$W_n$ is the white, Gaussian measurement noise vector at the instant $t_n$, of zero mean and covariance matrix $R_n = E[W_n^T \cdot W_n]$ (where $W_n^T$ is the vector transpose of Wn) and of dimension $N_{obs}$.

In this state model, the value of the state vector $X_n$ is a priori unknown. It is not directly accessible by measurement, unlike the observation vector $Z_n$, but only by way of the observation model.

The Kalman filter estimates the state vector using a propagation computation, on the basis of the propagation model, and using a readjustment computation, on the basis of the observations and the observation model.

To this end, the filter uses two variables:
the estimated state vector, denoted $X_{n/n}$ after readjustment at the instant $t_n$, denoted $X_{n+1/n+1}$ after propagation between the instants $t_n$ and $t_{n+1}$, and denoted $X_{n+1/n+1}$ after readjustment at the instant $t_{n+1}$, of dimension $N_{state}$.
the covariance matrix of the estimated state, denoted $P_{n/n}$ after readjustment at the instant $t_n$, denoted $P_{n+1/n}$ after propagation between the instants $t_n$ and $t_{n+1}$, and denoted $P_{n+1/n+1}$ after readjustment at the instant $t_{n+1}$, of dimension $N_{state} \times N_{state}$.

To perform the propagation computation, the filter uses the formulae:
for the estimated state vector:

$$X_{n+1/n} = F_n \cdot X_{n/n}$$

The propagation matrix $F_n$ is used to establish a linear relationship between the state vectors before propagation and after propagation.
for the covariance matrix:

$$P_{n+1/n} = F_n \cdot P_{n/n} \cdot F_n^T + Q_n$$

(in which $F_n^T$ represents the matrix transpose of $F_n$).

In this formula, the coefficients of the covariance matrix $P_n$ represent the variance of each of the components of the estimated state vector (diagonal terms) and the covariance of the various pairs of components of this vector (nondiagonal terms). This matrix $P_n$ represents the degree of confidence that is attributed to the estimated state vector.

The covariance matrix $Q_n$ for the propagation noise makes it possible to quantify the random portion and the approximations made in the propagation model for each component of the state vector $X_{n/n}$.

To perform the readjustment computation, the filter uses the formulae:
for the readjustment gain:

$$K_{n+1} = P_{n+1/n} \cdot H_{n+1}^T \cdot (H_{n+1} \cdot P_{n+1/n} \cdot H_{n+1}^T R_{n+1})^{-1}$$

(where $H_{n+1}^T$ is the matrix transpose of $H_{n+1}$).

The observation matrix $H_n$ is used to establish a linear relationship between the state vector and the measurements.

The covariance matrix $R_n$ characterizes the noise specific to the measurements. $R_n$ is a square matrix of dimension $N_{obs} \times N_{obs}$.
for the estimated state vector:

$$X_{n+1/n+1} = X_{n+1/n} + K_{n+1} \cdot (Z_{n+1} - H_{n+1} \cdot X_{n+1/n})$$

for the covariance matrix:

$$P_{n+1/n+1} = (Id_{state} - K_{n+1} \cdot H_{n+1}) \cdot P_{n+1/n}$$

(in which $Id_{Nstate}$ represents the identity matrix of dimension $N_{state} \cdot N_{state}$).

At the outset, the state vector $X_0$ is initialized to zero and the matrix $P_0$ is initialized with the variances and covariances that are representative of the uncertainty in the physical quantities modelled in the state vector.

The propagation computation involves the matrices $F_n$ and $Q_n$ to determine the propagated estimated state vector $X_{n+1/n}$ on the basis of the readjusted estimated state vector $X_{n/n}$ and the propagated covariance matrix $P_{n+1/n}$ on the basis of the readjusted covariance matrix $P_{n/n}$.

The readjustment computation involves the observations $Z_{n+1}$ arising from the measurements and the matrices $H_{n+1}$ and $R_{n+1}$, to determine the readjusted estimated state vector $X_{n+1/n+1}$ on the basis of the propagated estimated state vector $X_{n+1/n}$ and the readjusted covariance matrix $P_{n+1/n+1}$ on the basis of the propagated covariance matrix $P_{n/n}$.

The index n is then incremented by 1 (i.e. n=n+1) and the propagation and then the readjustment are repeated. A cycle of propagation, readjustment and incrementation of the index is thus linked together.

FIG. 2 shows a memory collecting $X_{n+1/n+1}$ and providing $X_{n/n}$ in order to indicate that the state vector value introduced into the propagation model for the computation of $X_{n+1/n}$ going back to the instant $t_{n+1}$ is the state vector value $X_{n/n}$ that has been computed at the preceding instant $t_n$. Equally, a memory for the covariance matrix $P_{n/n}$ and for the estimated position $G_{n/n}$ have been shown.

In the carrier code smoothing filter according to the preferred implementation of the invention, the state vector X and the evolution model represented by the matrices F and Q are as follows:

$$X = \begin{bmatrix} PD \\ B_{iono} \\ \delta_a \\ \delta_b \\ B_{RF} \end{bmatrix}$$

$$F = \begin{bmatrix} 1 & 0 & 0 & 0 & 0 \\ 0 & \lambda_{iono} & 0 & 0 & 0 \\ 0 & 0 & 1 & 0 & 0 \\ 0 & 0 & 0 & 1 & 0 \\ 0 & 0 & 0 & 0 & 1 \end{bmatrix}$$

$$Q = \begin{bmatrix} q_{PD} & 0 & 0 & 0 & 0 \\ 0 & q_{iono} & 0 & 0 & 0 \\ 0 & 0 & q_a & 0 & 0 \\ 0 & 0 & 0 & q_b & 0 \\ 0 & 0 & 0 & 0 & 0 \end{bmatrix}$$

in which:

PD represents the pseudo-distance without receiver measurement noise (thermal noise, interference, multiple paths) and without ionisopheric error;

PD=satellite/receiver distance+receiver clock bias x c+tropospheric error+satellite bias $B_{iono}$ represents the ionospheric error at a frequency (for example at the frequency Fa) after correction by the model (residual);

$\delta_a$ represents the float ambiguity of the carrier phase measurement at the frequency Fa;

$\delta_b$ represents the float ambiguity of the carrier phase measurement at the frequency Fb;

$B_{RF}$ represents the interfrequency bias of the analogue pathway at the frequency Fb compared with the analogue pathway at the frequency Fa;

$\lambda_{iono}$ represents the attenuation factor of the Markov model of the ionospheric error.

$$\lambda_{iono} = 1 - \Delta T/\tau$$

$\Delta T$ represents the adjustment period for the filter and $\tau$ represents the time constant of the Markov model (1$^{st}$ order) of the ionospheric error after correction by the model. It will be assumed that $\Delta T$=1s and $\tau$=2000 s $q_{PD}$ represents the true state noise over the pseudo-distance. A very high value will be chosen for this component, because a reliable evolution model is not available. By way of example, it will be assumed that $q_{PD}$=(1000 m)$^2$;

$q_{iono}$ represents the state noise of the Markov model (1$^{st}$ order) of the ionospheric error after correction by the model;

$$q_{iono} = \sigma_{iono}^2 + 2 + \Delta T/\tau$$

$\sigma_{iono}$ representing the standard deviation of the ionospheric error after correction by the model. It will be assumed that $\sigma_{iono}$=(20 m)$^2$ $q_a$ represents the state noise of the ambiguity of the carrier phase measurement at the frequency Fa. It will be assumed that $q_a$=(10$^{-2}$ m)$^2$ $q_b$ represents the state noise of the ambiguity of the carrier phase measurement at the frequency Fb. It will be assumed that $q_b$=(10$^{-2}$ m)$^2$ According to an alternative implementation, the state vector can comprise four states. In this case, the matrices F and Q of the evolution model also have a dimension of four. The state vector X and the evolution model become:

$$X = \begin{bmatrix} PD \\ B_{iono} \\ \delta_a \\ \delta_b \end{bmatrix}$$

$$F = \begin{bmatrix} 1 & 0 & 0 & 0 \\ 0 & \lambda_{iono} & 0 & 0 \\ 0 & 0 & 1 & 0 \\ 0 & 0 & 0 & 1 \end{bmatrix}$$

$$Q = \begin{bmatrix} q_{PD} & 0 & 0 & 0 \\ 0 & q_{iono} & 0 & 0 \\ 0 & 0 & q_a & 0 \\ 0 & 0 & 0 & q_b \end{bmatrix}$$

In the absence of a cycle jump from the carrier phase loop, the state noise on the ambiguities is zero. To allow for the risk of a cycle jump (nonlinear and non-Gaussian model), the time constant of the smoothing filter, which has a natural tendency towards infinity, is limited. The reason is that if the time constant is too great, then the effect of the cycle jump on the filtered pseudo-distance lasts for a long time, the time for which the filter converges and readjusts itself for the code measurement (without a jump). In the case of a repeated cycle jump, with a low signal-to-noise ratio, the jumps will accumulate before the filter has had time to converge on the code measurement, which can introduce an unacceptable measurement error. By way of example, five cycle jumps produce an error of 1 metre.

To limit the time constant, a non-zero state noise value is used.

The matrices representative of the measurements and of the observation model are written as follows:

$$Z_n = \begin{bmatrix} PD_{code\,a}(n) \\ PD_{carrier\,a}(n) \\ PD_{code\,b}(n) \\ PD_{carrier\,b}(n) \end{bmatrix}$$

$$R = \begin{bmatrix} \sigma^2_{code\,a} & 0 & 0 & 0 \\ 0 & \sigma^2_{carrier\,a} & 0 & 0 \\ 0 & 0 & \sigma^2_{code\,b} & 0 \\ 0 & 0 & 0 & \sigma^2_{carrier} \end{bmatrix}$$

$$H = \begin{bmatrix} 1 & +1 & 0 & 0 & 0 \\ 1 & -1 & 1 & 0 & 0 \\ 1 & +\gamma & 0 & 0 & 1 \\ 1 & -\gamma & 0 & 1 & 1 \end{bmatrix}$$

in which:

$PD_{code\,a}(n)$ represents the pseudo-distance measured for the code at the frequency Fa, at the instant $t(n)=n\cdot\Delta T$ $PD_{carrier\,a}(n)$ represents the pseudo-distance measured for the carrier at the frequency Fa, at the instant $t(n)=n\cdot\Delta T$ $PD_{code\,b}(n)$ represents the pseudo-distance measured for the code at the frequency Fb, at the instant $t(n)=n\cdot\Delta T$ $PD_{carrier\,b}(n)$ represents the pseudo-distance measured for the carrier at the frequency Fb, at the instant $t(n)=n\cdot\Delta T$ $\sigma_{code\,a}$ and $\sigma_{code\,b}$ respectively represent the standard deviation of the measurement error of the code phase specific to the receiver for the frequencies and b.

$\sigma_{carrier\,a}$ and $\sigma_{carrier\,b}$ respectively represent the standard deviation of the measurement error of the carrier phase specific to the receiver for the frequencies a and b.

On initialization, the state vector X and the covariance matrix P have the value:

$$X_{0/0} = \begin{bmatrix} 0 \\ 0 \\ 0 \\ 0 \\ 0 \end{bmatrix}$$

$$P_{0/0} = \begin{bmatrix} 1000^2 & 0 & 0 & 0 & 0 \\ 0 & \sigma^2_{iono} & 0 & 0 & 0 \\ 0 & 0 & 1000^2 & 0 & 0 \\ 0 & 0 & 0 & 1000^2 & 0 \\ 0 & 0 & 0 & 0 & \sigma^2_{RF} \end{bmatrix}$$

$\sigma_{iono}$ represents the standard deviation of the ionospheric error on the axis in sight of the satellite under consideration. Its value is given by atmospheric models, depending on the inclination of the satellite axis, the latitude of the receiver and the time of day. It will be assumed that $\sigma_{iono}=30$ m.

$\sigma_{RF}$ represents the standard deviation of the error for the interfrequency bias on the axis in sight of the satellite under consideration. It will be assumed that $\sigma_{RF}=3$ m.

When a satellite disengages at a frequency, that is to say that one of the two dual-frequency signals transmitted by a geopositioning satellite is not received by the terminal or is received with too low an amplitude, the observation model is modified. The two rows corresponding to these measurements in the matrices Z, R and H are removed.

If, by way of example, on a satellite axis, the measurements at the frequency Fb become unavailable and only the measurements at the frequency Fa are available, then the matrices representative of the observation model become:

$$Z_n = \begin{bmatrix} PD_{code\,a}(n) \\ PD_{carrier\,a}(n) \end{bmatrix}$$

$$R = \begin{bmatrix} \sigma^2_{code\,a} & 0 \\ 0 & \sigma^2_{carrier\,a} \end{bmatrix}$$

$$H = \begin{bmatrix} 1 & +1 & 0 & 0 & 0 \\ 1 & -1 & 1 & 0 & 0 \end{bmatrix}$$

Similarly, when the measurements at the frequency Fa become unavailable, the observation model is written as follows:

$$Z_n = \begin{bmatrix} PD_{code\,b}(n) \\ PD_{carrier\,b}(n) \end{bmatrix}$$

$$R = \begin{bmatrix} \sigma^2_{code\,b} & 0 \\ 0 & \sigma^2_{carrier\,b} \end{bmatrix}$$

$$H = \begin{bmatrix} 1 & +\gamma & 0 & 0 & 1 \\ 1 & -\gamma & 1 & 0 & 1 \end{bmatrix}$$

When the measurements become available again, the two rows associated with these measurements in the matrices Z, R and H are restored. Moreover, for the frequency that has reappeared, the estimate of the ambiguity of the phase measurement of the state vector X is reset to 0 for the readjustment for the 4 measurements. The diagonal coefficient (variance) associated with the carrier phase ambiguity in the matrix P is reset to a very high value in the face of the orders of magnitude that are currently used. This value is increased artificially in order to indicate to the filter that the estimate of the ambiguity is no longer good, and that it should therefore reset it. This variance may be fixed at a value of $1000^2$.

When the measurements at the frequency Fa become available again, the state vector X and the covariance matrix P are written as follows:

$$X_{n+1/n} = \begin{bmatrix} PD_{n+1/n} \\ B_{iono\,n+1/n} \\ 0 \\ \delta_{b\,n+1/n} \\ B_{RF} \end{bmatrix}$$

$$P_{n+1/n}P_{n+1/n} = \begin{bmatrix} 0 & 0 & 0 & 0 & 0 \\ 0 & 0 & 0 & 0 & 0 \\ 0 & 0 & 1000^2 & 0 & 0 \\ 0 & 0 & 0 & 0 & 0 \\ 0 & 0 & 0 & 0 & 0 \end{bmatrix}$$

Similarly, when the measurements at the frequency Fb become available again, the following are obtained:

$$X_{n+1/n} = \begin{bmatrix} PD_{n+1/n} \\ B_{iono\ n+1/n} \\ \delta_{b\ n+1/n} \\ 0 \\ B_{RF} \end{bmatrix}$$

$$P_{n+1/n}P_{n+1/n} = \begin{bmatrix} 0 & 0 & 0 & 0 & 0 \\ 0 & 0 & 0 & 0 & 0 \\ 0 & 0 & 0 & 0 & 0 \\ 0 & 0 & 0 & 1000^2 & 0 \\ 0 & 0 & 0 & 0 & 0 \end{bmatrix}$$

When a discontinuity is observed in the carrier phase measurement at one of the two frequencies, the state vector and the covariance matrix are reset in the same way before the readjustment for the new carrier phase measurement.

The Kalman filter makes it possible to perform both carrier code smoothing and "iono-free" combination. At the output of the carrier code smoothing, the useful datum is the pseudo-distance PD filtered and corrected for the ionospheric error, corresponding to the first coordinate of the estimated state vector after readjustment $X_{n+1/n+1}$.

Advantageously, since the corrections to the model are applied upstream of the Kalman filter, the latter now merely has to identify the residual ionospheric error. The error computed using the model obeys the same Markov model as the ionospheric error, hence a fortiori the difference too, with a smaller amplitude. As the correction is itself proportional to the inverse of the square of the frequency, the residual error is too, therefore the observation model linking the state of the filter to the dual-frequency measurements remains unchanged.

The Kobuchar and Nequick models are models for forecasting the ionospheric error that are normally used to correct single-frequency measurements. In the case of dual-frequency measurements, "iono-free" combination of signals at two different frequencies normally allows the ionospheric error to be eliminated. In the method according to the invention, this method is useful when one of the two frequencies is no longer available and the measurement ends up single frequency.

When one of the two frequencies is no longer available over a long period, for example following jamming or too small an amplitude, dual-frequency operation changes to single-frequency operation. At first, the filter will operate naturally on an achievement of dual-frequency operation with the ionospheric bias estimated when the dual-frequency signals are present, and gradually this estimate of the bias will expire because this bias has changed. As a correction to the ionospheric error is applied upstream of the Kalman filter, the method will progressively change from "iono-free" combination at two frequencies to operation that is equivalent to a single-frequency case, but one corrected using the model for forecasting the ionospheric error.

A step Etp5 of correcting tropospheric delays can then be applied to the pseudo-distance measurement at the output of the Kalman filter for each satellite. This compensation is obtained by applying a conventional model depending, inter alia, on the time of day and the geographical position of the satellite under consideration.

A step Etp6 of correcting "system" errors can then be applied for each satellite axis. These errors are linked to the principle of the GNSS. They involve, by way of example, the Sagnac effect due to the time shift in the reception of two signals rotating in opposite directions. These errors also include the imprecision of atomic clocks. During this step, the relativistic effect is also corrected. These corrections to be made are provided by the satellite under consideration through a "navigation" message containing the corrective terms. These corrected terms are common to the four measurements from one and the same satellite.

Once these corrections have been made, the computation module estimates the position of the geopositioning terminal by combining the filtered and corrected pseudo-distances computed for each satellite visible to the terminal using the resolution algorithm, PVT for "Position, Velocity and Time". As set out above, at least four pseudo-distances are necessary.

According to an alternative implementation, the steps of correcting tropospheric delays Etp5 and "system" errors Etp6 can be performed upstream of the Kalman filtering provided that these corrections are applied to the four pseudo-distance measurements.

The computation module can comprise one or more microprocessors, processors, computers or any other equivalent means programmed as appropriate.

The invention claimed is:

1. A satellite geopositioning method implemented by a geopositioning terminal on the basis of at least four satellites each transmitting electromagnetic geopositioning signals, known as dual-frequency signals, at two different frequencies, each of the signals being formed by a carrier frequency modulated by a spreading code, the terminal comprising at least one reception module configured to receive the electromagnetic signals originating from each satellite at two different frequencies and at least one computation module configured to process the signals, the method comprising, for each geopositioning satellite;
  using the computation module to:
    compute, four pseudo-distances on the basis of the two codes and the two carriers of the received dual-frequency geopositioning signals received by the terminal reception module;
    compute a correction of the ionospheric delays over each computed pseudo-distance by applying an ionospheric error propagation model;
    perform a carrier code smoothing using a Kalman filter whose measurement vector comprises the four corrected pseudo-distances in order to provide a single pseudo-distance measurement without measurement noise and to correct the residual ionospheric error; and
  determine an estimated position of the geopositioning terminal by using the corrected pseudo-distances computed for each satellite.

2. The method of claim 1, further comprising determining a correction of tropospheric delays.

3. The method of claim 1, further comprising generating a correction of system errors.

4. The method of claim 1, further comprising calculating a compensation for an interfrequency bias between the dual-frequency signals, prior to the carrier code smoothing.

5. The method of claim 1 wherein the Kalman filter is configured to propagate a state vector comprising the value of the pseudo-distance without measurement noise, the value of the ionospheric error at a frequency after correction by the ionospheric error propagation model and the values of float ambiguities of carrier phase measurements at each of the two frequencies.

6. The method of claim 1 wherein the Kalman filter is configured to propagate a state vector moreover comprising the value of an interfrequency bias between the dual-frequency signals.

7. The method of claim 1 wherein the ionospheric error propagation model is a Klobuchar model.

8. The method of claim 1 wherein the ionospheric error propagation model is a Nequick model.

9. The method of claim 1, further comprising storage of the ionospheric error.

10. A geopositioning terminal, comprising:
at least one reception module configured to receive electromagnetic geopositioning signals, known as dual-frequency signals, transmitted by at least four satellites at two different frequencies, each of the signals being formed by a carrier frequency modulated by a spreading code; and
at least one computation module configured to process the geopositioning signals by:
computing, four pseudo-distances for each satellite on the basis of the two codes and the two carriers of the respective received dual-frequency geopositioning signals received by the terminal reception module;
computing a correction of the ionospheric delays over each computed pseudo-distance by applying an ionospheric error propagation model;
performing a carrier code smoothing using a Kalman filter whose measurement vector comprises the four corrected pseudo-distances in order to provide a single pseudo-distance measurement without measurement noise and to correct the residual ionospheric error; and
determining an estimated position of the geopositioning terminal by using the corrected pseudo-distances computed for each satellite.

11. The method of claim 4 wherein the Kalman filter is configured to propagate a state vector comprising the value of the pseudo-distance-without measurement noise, the value of the ionospheric error at a frequency after correction by the ionospheric error propagation model and the values of float ambiguities-of carrier phase measurements at each of the two frequencies.

12. The method of claim 11 wherein the Kalman filter is configured to propagate a state vector moreover comprising the value of an interfrequency bias between the dual-frequency signals.

13. The method of claim 4 wherein the Kalman filter is configured to propagate a state vector moreover comprising the value of an interfrequency bias between the dual-frequency signals.

14. The method of claim 2 wherein the Kalman filter is configured to propagate a state vector comprising the value of the pseudo-distance without measurement noise, the value of the ionospheric error at a frequency after correction by the ionospheric error propagation model and the values of float ambiguities of carrier phase measurements at each of the two frequencies.

15. The geopositioning terminal of claim 10 wherein the computation module is further configured to determine a correction of tropospheric delays.

16. The geopositioning terminal of claim 10 wherein the computation module is further configured to generate a correction of system errors.

17. The geopositioning terminal of claim 10 wherein the computation module is further configured to calculate a compensation for an interfrequency bias between the dual-frequency signals, prior to the carrier code smoothing.

18. The geopositioning terminal of claim 10 wherein the Kalman filter is configured to propagate a state vector comprising the value of the pseudo-distance without measurement noise, the value of the ionospheric error at a frequency after correction by the ionospheric error propagation model and the values of float ambiguities of carrier phase measurements at each of the two frequencies.

19. The geopositioning terminal of claim 18 wherein the Kalman filter is configured to propagate a state vector moreover comprising the value of an interfrequency bias between the dual-frequency signals.

20. The geopositioning terminal of claim 10 wherein the Kalman filter is configured to propagate a state vector moreover comprising the value of an interfrequency bias between the dual-frequency signals.

* * * * *